July 28, 1959 H. O. LEWIS 2,897,454

SWEEP GENERATOR

Filed April 9, 1957 2 Sheets-Sheet 1

INVENTOR
HERBERT O. LEWIS
BY Woody and Haraha
ATTORNEYS

July 28, 1959 H. O. LEWIS 2,897,454

SWEEP GENERATOR

Filed April 9, 1957 2 Sheets-Sheet 2

INVENTOR
HERBERT O. LEWIS
BY Moody and Harsha
ATTORNEYS

United States Patent Office
2,897,454
Patented July 28, 1959

2,897,454

SWEEP GENERATOR

Herbert O. Lewis, Canoga Park, Calif., assignor to Collins Radio Company, Cedar Rapids, Iowa, a corporation of Iowa Application April 9, 1957, Serial No. 651,717

4 Claims. (Cl. 331—180)

This invention relates to sweep oscillators and more particularly to sweep oscillators having an automatically controlled output signal. Many applications of sweep generators or oscillators require that constant amplitude output signals be maintained as the oscillator is swept over a prescribed frequency range. There are many factors which would cause the variations in the output signal amplitudes, but mainly it is due to the inherent nature of oscillator circuits that a different magnitude output signal is generated at different frequencies.

This invention is a sweep generator which uses a varied input voltage level to vary the output signal frequency and yet maintains the output signals at a predetermined and fixed amplitude. Prior sweep generator circuits have not been able to maintain a fixed output signal level for various frequencies. This is especially true where the various output frequencies result from variations in the magnitude of the input voltage.

It is an object of this invention to provide a sweep generator having a novel feedback circuit so that a fixed output signal level is maintained for all of the output frequencies. It is another object of this invention to provide a sweep generator where the frequency sweep is caused by the variation in the magnitude of the input signal voltage. It is still another object of this invention to provide a sweep generator, where the output frequency is varied by the magnitude of the input voltage, which generates constant amplitude output signals. It is yet another object of this invention to provide a sweep generator circuit which is economical and simple in its construction.

It is a further object of this invention to provide a sweep generator controlled by the magnitude of the input signal voltage which produces output signals of fixed amplitude over a large frequency deviation. It is still a further object of this invention to provide a sweep generator circuit having this large frequency deviation at low frequencies without heterodyning effects and with good sweep linearity. It is another object of this invention to provide a sweep generator circuit having fixed output signal levels with low distortion over the entire frequency deviation range.

Figure 1:
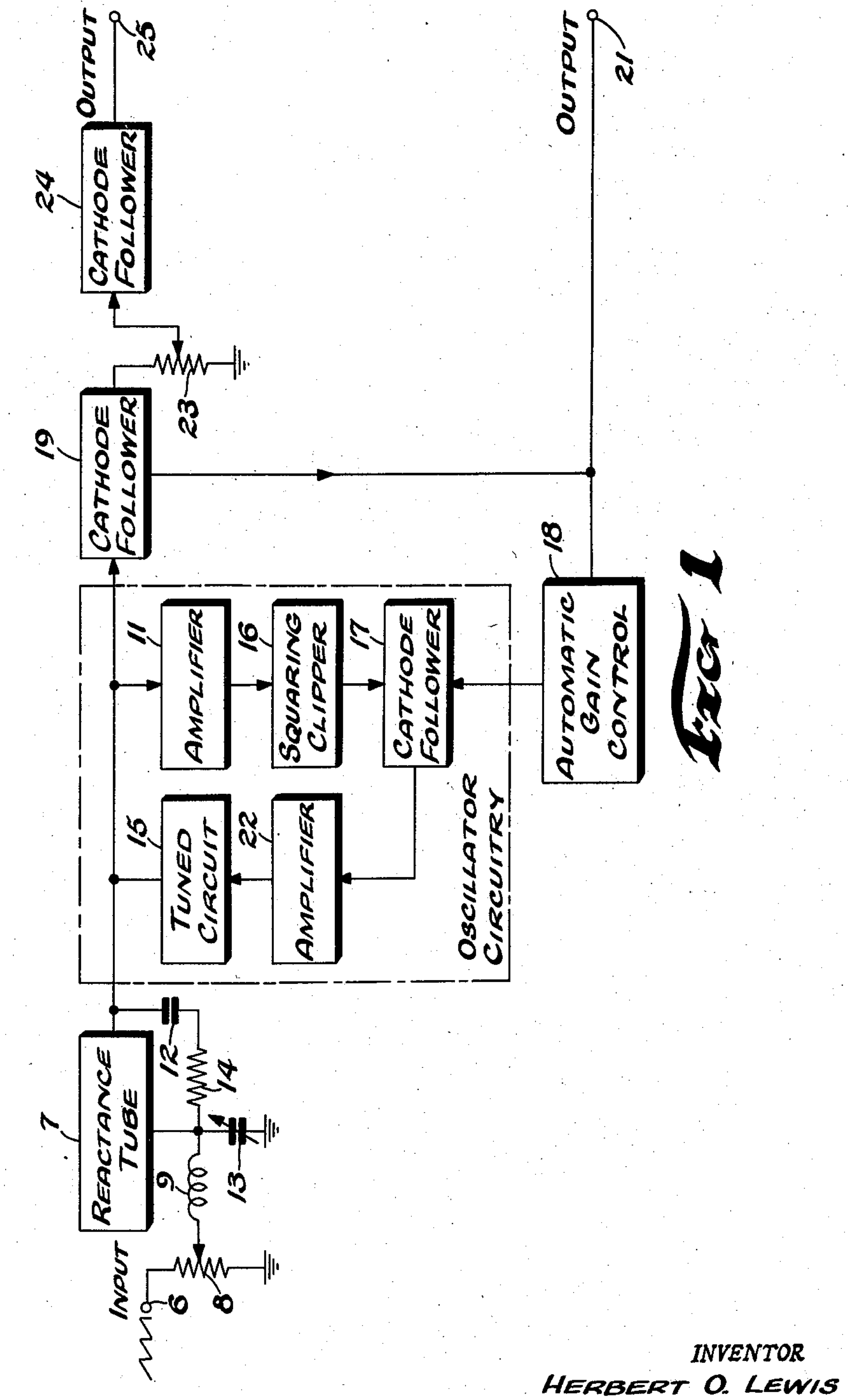
Figure 2:
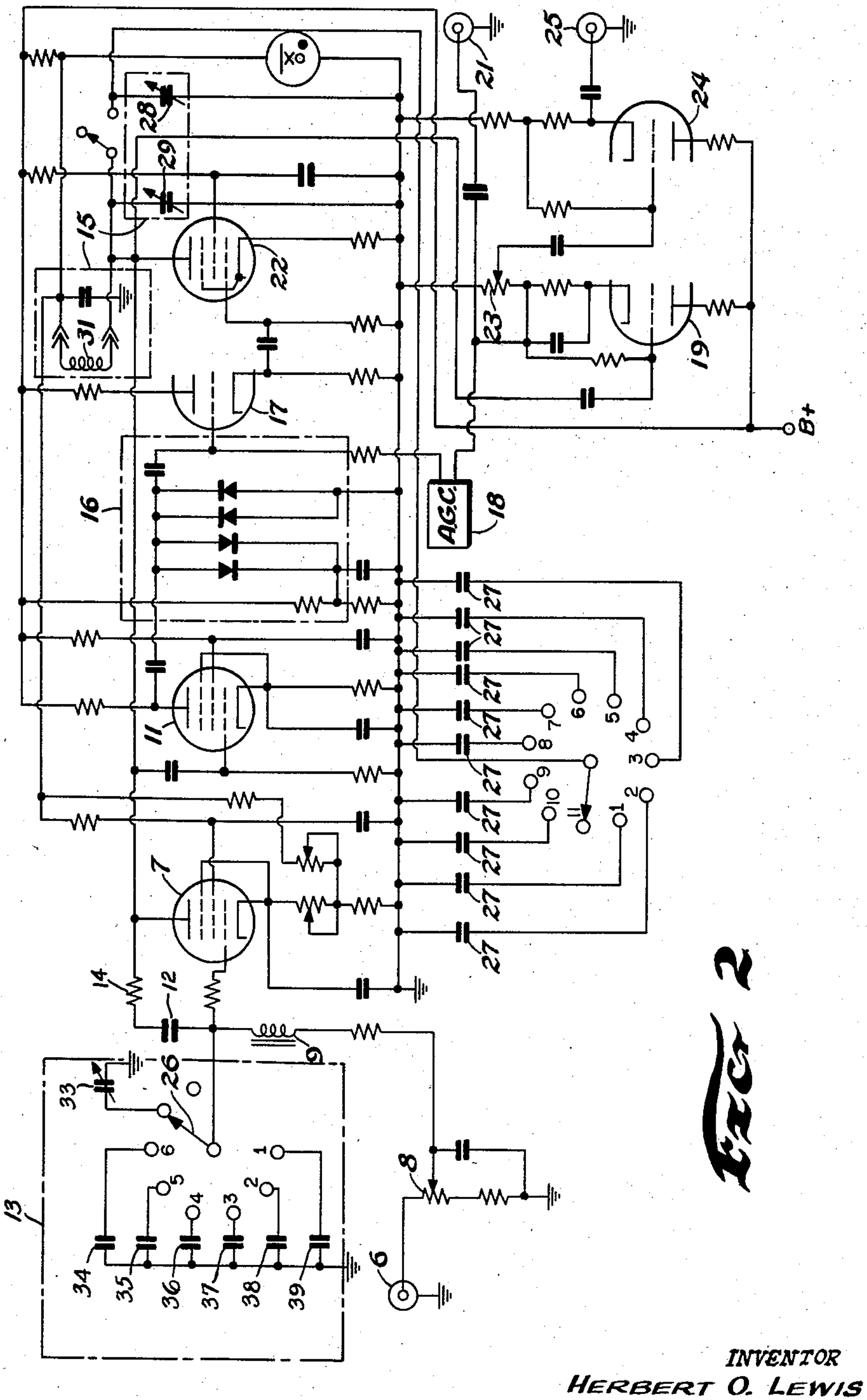

These and other objects of this invention will become apparent when the following description is read in conjunction with the accompanying drawings, in which Figure 1 is a block diagram of one embodiment of this invention, and Figure 2 is a schematic diagram of one embodiment of this invention which was caused to be constructed.

Referring now to Figure 1, the input signal applied to terminal 6 is normally a saw-tooth voltage. This saw-tooth voltage may be generated by any of the well-known means, and the manner of generation is not important herein. This saw-tooth input signal is applied from the terminal to the reactance tube 7. This voltage or signal is applied to the reactance tube 7 through the resistance element 8 and the choke element 9. The resistance element 8 is a variable resistance element which, when varied, controls the band width of the generator or oscillator without changing the center frequency. The potentiometer or variable resistance element 8 attenuates the input saw-tooth signal and thus varies the static plate current of the reactance tube 7. The signal frequency variations in the plate current of the reactance tube 7 change the apparent inductance of the tube. The sweep range set, which is also a phase shifting network, includes the capacitance 12, the resistance element 14, and the variable capacitance element 13. The variable capacitance element 13 of this phase shifting network actually determines the percentage of the plate signal that is impressed upon the grid of the reactance tube. Control of this plate current actually determines the apparent inductance by controlling the oscillator frequency current. Changing of the capacitance element 13 also will shift the center frequency of the sweep generator and require that the oscillator tank circuit, or tuned circuit, be redetermined.

The amplifier 11 receives the output voltage signal from the tuned circuit 15. The tuned circuit 15 normally consists of a plug-in coil and variable capacitors which permit the adjustment of the center frequency. The reactance tube transacts with the tuned circuit and contributes a variable shunt inductance in this transaction. The inductances of the tuned circuit are normally large in order to obtain wide sweep ranges. The Q of the tuned circuit is lowered by the interaction of the reactance tube and grid return resistors. The Q of the tuned circuit may, in some embodiments of this invention, be no greater than three. The reactance tube is an apparent inductance due to the RC phase shift network causing the plate current to lag the plate voltage by almost 90°.

The output signal from the tuned circuit and the reactance tube is amplified by the amplifier 11, and the amplified signal applied to the clipping network 16. This clipping network is a squaring clipper which generates an approximately square wave signal from the amplified input signal. The output signal from the squaring clipper is applied to the cathode follower 17. The second input signal to the cathode follower 17 comes from the automatic gain control circuit 18. The automatic gain control has an input signal from the cathode follower 19 and utilizes this signal to produce an automatic gain controlled signal which maintains the sweep generator output signal at a fixed magnitude. One possible automatic gain control circuit for use in this invention might consist of a biased clipper which conducts when the peak output of the cathode follower 19 exceeds a specific bias. The resultant pulse might be amplified, detected, and then applied as the automatic gain control signal to the cathode follower 17. Any automatic gain control circuit used with this invention must cause a minimum of distortion in the output signal. The cathode follower 17 generates an output signal from its two input signals which is a square wave of varying amplitude. The square wave signal generated by the cathode follower 17 is applied to the amplifier 22 for proper amplification with the output signal from the amplifier 22 applied to the tuned circuit 15. As is apparent, the tuned circuit 15 is now controlled as to the magnitude of its output, and this signal is fed to the cathode follower 19. The cathode follower 19 provides the input signal to the cathode follower 24 through the variable resistance element 23. The variable resistance element 23 permits the selection of the variable output signal level at the terminal 25 while a fixed output signal level is provided at the output terminal 21 by the automatic gain control circuit and the tuned circuit. The sweep generator of this invention thus provides both a fixed magnitude output signal and a variable magnitude output signal. This sweep generator provides sharp limiting without excessive distortion of the wave form. This distortion has been a major disadvantage of prior non-heterodyning sweep generator circuits which this invention overcomes.

Referring now to Figure 2 which is a schematic diagram of one embodiment of this invention, the same numbers refer to the same elements as in Figure 1. This schematic diagram fills in the blocks of Figure 1 with specific elements of one embodiment of this invention which was caused to be constructed. The input signal, which was a saw-tooth voltage, is applied to the terminal 6 and then to the grid of the reactance tube 7. This reactance tube 7 is a pentode with the sweep range setting controlled by the introduction of the various capacitance elements 33—39 through the rotating contact element 26. The sweep range, as described above, is varied by potentiometer 8. The inductor 9 is also connected to the sweep range potentiometer 8 and the grid of the reactance tube 7. The RC phase shift network applies a 90° lagging signal from the plate of the reactance tube to the grid of the reactance tube. Inasmuch as the plate current of a pentode is normally in phase with the grid voltage, the plate current will now also lag the plate voltage by almost 90°. Thus, the reactance tube 7 appears inductive. The signal from the reactance tube is applied to the tuned circuit 15. The tuned circuit 15 includes the plurality of capacitance elements associated with the course center frequency adjustment, the variable medium center frequency adjustment, and the variable fine center frequency adjustment. These elements are, respectively, capacitances 27, 28, and 29. The coil 31 is a plug-in coil which associates with the variable capacitance elements which adjust the center frequency. The reactance tube 7 is an apparent variable shunt inductance to the tuned circuit 15. The signal from the tuned circuit and the reactance tube 7 is applied to the amplifier 11. The amplifier 11 is, in one embodiment, a pentode which provides medium amplification with little distortion of the signal. This output signal is then applied to the squaring clipper 16. The squaring clipper 16 is composed of a plurality of diodes and resistance and capacitance elements connected to provide a square wave output to the cathode follower 17. This cathode follower 17 is biased by the automatic gain control circuit 18, and this control bias plus the output signal from the squaring clipper 16 are applied to the grid of the cathode follower 17. The output signal from the cathode follower 17 is applied to the amplifier 22. This amplifier 22 has its plate circuit connected to the tuned circuit 15, and the output signal which results from the tuned circuit 15, the amplifier 22, and the reactance tube 7 is applied to the grid of the cathode follower 19. The output from the first cathode follower is applied to the fixed output signal terminal 21 and to the variable resistance element 23. The voltage developed across the potentiometer 23 is applied to the grid of cathode follower 24 thereby generating a variable output signal controlled by the resistance element 23. This variable output signal is applied to the output terminals 25 from the cathode follower 24.

Although this invention has been described with respect to a particular embodiment thereof, it is not to be so limited as changes and modifications may be made therein which are within the full intended scope of the invention as defined by the appended claims.

What is claimed is:

1. A sweep generator circuit including input means having applied thereto input signals of generally saw-tooth wave form, a reactance tube having input and output terminals, the input terminal of said reactance tube connected to said input means and receiving said input signals, a phase-shifting means, said phase-shifting means connected across the input and output terminals of said reactance tube, an oscillatory means, said oscillatory means including said reactance tube, a tuned circuit, amplifier means, clipping means, and a first cathode follower; said amplifier means, said clipping means and said first cathode follower being connected in cascade across said tuned circuit as feedback means; a second cathode follower connected to said tuned circuit, an automatic gain control means, said second cathode follower connected to said automatic gain control means and applying thereto the output signals from said second cathode follower, output signals from said automatic gain control means connected to said first cathode follower to control the amplitude of the output signal from said tuned circuit, and output means connected to said second cathode follower for removing therefrom output signals of constant amplitude generated in response to said saw-tooth input signals.

2. A sweep generator circuit including input means having applied thereto input signals of generally saw-tooth wave form, a reactance tube having input and output terminals, the input terminal of said reactance tube connected to said input means and receiving said input signals, a phase-shifting means, said phase-shifting means connected across the input and output terminals of said reactance tube, an oscillatory means, said oscillatory means including said output terminal of said reactance tube, a tuned circuit, amplifier means, clipping means and a first cathode follower; said amplifier means, said clipping means and said first cathode follower being connected in cascade across said tuned circuit as feedback means; a second cathode follower, an automatic gain control means, said second cathode follower connected to said automatic gain control means and applying thereto the output signals from said second cathode follower connected to said tuned circuit, output signals from said automatic gain control means connected to said first cathode follower to control the amplitude of the output signal from said tuned circuit, a third cathode follower, a voltage divider network, said third cathode follower connected to said second cathode follower by said divider network to produce an adjustable amplitude output signal at the various frequencies, and output means connected to said second cathode follower for removing therefrom output signals of constant amplitude generated in response to said saw-tooth input signals.

3. A sweep generator circuit including input means having applied thereto input signals of generally saw-tooth wave form, a reactance tube having input and output terminals, the input terminal of said reactance tube connected to said input means and receiving said input signals, a phase-shifting means, said phase-shifting means including a fixed capacitance element, a resistance element, and a variable capacitance element; said phase-shifting means connected across the input and output terminals of said reactance tube, an oscillatory means, said oscillatory means including said output terminal of said reactance tube, a tuned circuit, amplifier means, clipping means, and a first cathode follower; said amplifier means, said clipping means and said first cathode follower being connected in cascade across said tuned circuit as feedback means; a second cathode follower connected to said tuned circuit, an automatic gain control means, said second cathode follower connected to said automatic gain control means and applying thereto the output signals from said second cathode follower, output signals from said automatic gain control means connected to said first cathode follower to control the amplitude of the output signal from said second tuned circuit, and output means connected to said second cathode follower for removing therefrom output signals of constant amplitude generated in response to said saw-tooth input signals.

4. A sweep generator circuit including input means having applied thereto input signals of generally saw-tooth wave form, a reactance tube having input and output terminals, the input terminal of said reactance tube connected to said input means and receiving said input signals, a phase-shifting means, said phase-shifting means including a fixed capacitance element, a resistance element, and a variable capacitance element; said phase-shifting means connected across the input and output terminals of said reactance tube, an oscillatory means, said oscillatory means including said output terminal of said reactance tube, a tuned circuit, amplifier means, clipping means, and a first cathode follower; said amplifier means, said clipping means, and said first cathode follower being connected in cascade across said tuned circuit as feedback means; a second cathode follower connected to said tuned circuit, an automatic gain control means, said second cathode follower connected to said automatic gain control means and applying thereto the output signals from said second cathode follower, output signals from said automatic gain control means connected to said first cathode follower to control the amplitude of the output signal from said tuned circuit, a third cathode follower, a voltage divider network, said third cathode follower connected to said second cathode follower by said divider network to produce an adjustable amplitude output signal at the various freqeuncies, and output means connected to said second cathode follower for removing therefrom output signals of constant amplitude generated in response to said saw-tooth input signals.

References Cited in the file of this patent

UNITED STATES PATENTS

| | | |
|---|---|---|
| 2,451,021 | Detuno | Oct. 12, 1948 |
| 2,486,265 | Dennis | Oct. 25, 1949 |

OTHER REFERENCES

Electronics, October 1952, pp. 154–155, "Stable Output Oscillator," Rubin.